US012786577B2

(12) United States Patent
Diaconu et al.

(10) Patent No.: US 12,786,577 B2
(45) Date of Patent: Nov. 3, 2026

(54) SYSTEM, DEVICE AND METHOD FOR DEMULTIPLEXING PHOTODETECTOR SIGNALS FOR MULTICHANNEL SPECTRAL DETECTION

(71) Applicants: Vasile Diaconu, Montreal (CA); Jocelyn Faubert, Montreal (CA)

(72) Inventors: Vasile Diaconu, Montreal (CA); Jocelyn Faubert, Montreal (CA)

( * ) Notice: Subject to any disclaimer, the term of this patent is extended or adjusted under 35 U.S.C. 154(b) by 286 days.

(21) Appl. No.: 18/764,316

(22) Filed: Jul. 4, 2024

(65) Prior Publication Data

US 2025/0016463 A1 Jan. 9, 2025

Related U.S. Application Data

(60) Provisional application No. 63/524,882, filed on Jul. 4, 2023.

(51) Int. Cl.
*H04N 25/13* (2023.01)

(52) U.S. Cl.
CPC .................................. *H04N 25/134* (2023.01)

(58) Field of Classification Search
CPC ........................... H04N 25/134; H04N 23/841
See application file for complete search history.

(56) References Cited

U.S. PATENT DOCUMENTS 11,624,652 B2 * 4/2023 Ben-Shahar .............. G01J 3/28 382/191
11,758,294 B2 * 9/2023 Kim ..................... H04N 25/134 348/336
12,262,124 B2 * 3/2025 Moon .................... H04N 25/10

* cited by examiner

*Primary Examiner* — Sinh Tran
*Assistant Examiner* — Angel L Garces-Rivera
(74) *Attorney, Agent, or Firm* — PRAXIS

(57) ABSTRACT

Demultiplexing photodetector signals for multichannel spectral detection uses three photodetectors having respective spectral maximal sensitivities to light within short, medium, and long wavelength zones to produce photodetector signals indicative of their respective spectral excitation levels within their respective wavelength zones. A distinctive color signal is produced for a photodetector signal indicating that this photodetector is at its highest spectral excitation level within its wavelength zone relative to the other photodetectors. An intermediary color signal is produced for a photodetector signal indicating that this photodetector is not at its highest spectral excitation level within its wavelength zone and overlaps with the excitation level of another photodetector. Distinctive and intermediary color signals are communicated to color channels activated by one of the received distinctive and intermediary color signals to produce respective distinctive or intermediary colors.

20 Claims, 4 Drawing Sheets

SYSTEM, DEVICE AND METHOD FOR DEMULTIPLEXING PHOTODETECTOR SIGNALS FOR MULTICHANNEL SPECTRAL DETECTION

CROSS-REFERENCE TO RELATED APPLICATIONS

The present application claims priority on U.S. Provisional Patent Application No. 63/524,882 filed on Jul. 4, 2023 and incorporated herein in its entirety.

TECHNICAL FIELD

The present disclosure generally relates to photodetectors and color channels. More particularly, but not exclusively, the present disclosure relates to demultiplexing photodetector signals for multichannel spectral detection.

BACKGROUND

Color vision in primates is accomplished by a mechanism that has evolved within the visual system to generate typical chromatic sensations from various wavelengths of the visible spectrum by exciting a minimal number of broadband sensitivity photodetectors types in order to preserve an efficient visual acuity and ensure uniform spectral sensitivity for all wavelengths of the visible spectrum. In the first stage of this process, electromagnetic waves in the spectral band from 400 nm to 700 nm activate three types of photo pigments of wide bands of spectral absorptions, with maximum absorptions rates for wavelengths of 445 nm, 545 nm and 565 nm. Each photodetector type contains one type of photo-pigment. The retinal neural network modulates the signals from the three-photodetector types and transmits signals via specific neural pathways for color perception, such as red, yellow, green and blue. There is also an achromatic pathway associated with the perception of white.

Observed initially by Hering (1834-1918), and later demonstrated by Hurvich (1957), the perception of red does not occur simultaneously with the perception of green, just as the perception of blue does not occur simultaneously with the perception of yellow. Consequently, an antagonistic mechanism controls the perception for these colors.

Currently, there is a consensus that color vision in humans initiated by signals from the three types of photodetectors (cones) partitions the visible spectrum band into three sensitivity domains, for short(S), medium (M) and long (L) wavelengths. The spectral sensitivity bands of three types of cones overlap ensuring that the visual system has a relatively uniform and continuous sensitivity along the visible spectrum. However, the wide spectral sensitivity bands of three types of photodetectors do not allow a direct correlation between the photodetectors' wavelength response and the colors perceived from the various wavelength bands of the visible spectrum. In fact, the retinal neural network compares, differentiates and redirects signals from the three photodetectors to the cortex through several chromatic pathways. The signals in the various chromatic pathways are activated or inhibited according to the spectral composition of the light that excites the three types of photodetectors so that the activation of a chromatic pathway is obtained from a narrowed spectral band representing a specific color perceived for this spectral area. Thus, the retinal neural network transforms the signals of the three types of photodetectors to several chromatic pathways for the perception of red, yellow, green, blue, and white.

The current concept that explains how the retinal neural system accomplishes multiple chromatic pathways proposes that the signals of the three types of photodetectors are transformed on the one hand by subtractive processes to activate certain chromatic pathways and on the other hand by additive processes to activate other chromatic pathways. It is understood that a subtractive process is fundamental to explain the creation of antagonistic chromatic pathways like red and green. However, the concept of signal additivity to explain the yellow and white chromatic pathway creations remains on a pure hypothetical basis. While some color pathways, such as red and green, receive their excitations through subtractive transformations of photodetector signals, other color pathways, such as yellow and white, are excited by the same signals, but following an additive process. It remains difficult to understand how such color pathways, defined as independent, could coordinate with each other in order to maintain a balance for the red, green and yellow color perceptions for the various qualities and intensities of retinal lighting. In fact, the current concept that explains the creation of the different color pathways through the retina's neural network is not compatible with its implementation in a physical instrument in order to characterize colors in a way similar to the visual system.

The RGB color model refers to a method to generate colors by additive combination of various proportions of three primary colors like red, green, and blue. An RGB camera is an instrument used to provide color-coded images by capturing ambient light through a matrix of different pixels with spectral sensitivities in a specific wavelength area of the visible spectrum such as long, medium, and short wavelengths for perceptions of red, green, and blue colors, respectively. All colors in an RGB camera are encoded from three types of photoreceptors that capture lights from the specific areas of the visible spectrum apparently similar to the retinal photodetectors system of the human eye (red, green, blue or RGB). The color of an image captured by an RGB camera is represented by the various light intensities of this image in the three spectral zones specific to the sensitivity of the three types of camera photo detectors. Then it is possible to reconstruct a colored image on screens with three types of luminous pixels for red, green and blue whose intensity of each type luminous pixel will follow the intensity of the corresponding pixel of the camera. Based on the RBG model system, a plurality of different colors can be displayed via display screens, but these screens do not display all the colors that the human visual system perceives in nature, resulting in color confusion.

OBJECTS

An object of the present disclosure is to provide a system for demultiplexing photodetector signals for multichannel spectral detection.

An object of the present disclosure is to provide a device for demultiplexing photodetector signals for multichannel spectral detection.

An object of the present disclosure is to provide a method for demultiplexing photodetector signals for multichannel spectral detection.

SUMMARY

In accordance with an aspect of the present disclosure, there is provided a system for demultiplexing photodetector signals for multichannel spectral detection, the system comprising: three types of photodetectors for detecting light, each of the three types of photodetectors having a respective maximal spectral sensitivity to the light within a respective one of a short, medium and long wavelength zone thereof, each of the three types of photodetectors producing a respective photodetector signal indicative of a respective spectral excitation level thereof within the respective wavelength zones thereof; a controller in operative communication with the three types of photodetectors and comprising a memory of processor executable code that when executed perform computer implementable steps comprising: receiving the photodetector signals; determining the spectral excitation level of each of the three photodetector types within the respective wavelength zones thereof based on the received photodetector signals; producing a given one of three distinctive color signals for a given one of the received photodetector signals when the given one of the received photodetector signals is indicative of a highest spectral excitation level of a given one of the three types of photodetectors within the respective wavelength zone thereof relative to the other two photodetector types; producing a given one of a plurality of intermediary color signals for a given one of the received photodetector signals when the given one of the received photodetector signals is indicative that a given one of the three photodetector types is not at the highest spectral excitation level thereof within the respective wavelength zone thereof and the the spectral excitation level thereof overlaps with the spectral excitation level of one or both of the other two photodetectors; communicating the produced given distinctive and intermediary color signals; and a plurality of color channels in operative communication with the controller for receiving the communicated given distinctive and intermediary color signals therefrom, wherein each of the color channels is respectively activated by a respective one of the received given distinctive and intermediary color signals to produce a respective color selected from three distinctive colors and a plurality of intermediary colors.

In accordance with an aspect of the present disclosure, there is provided a device for demultiplexing photodetector signals for multichannel spectral detection, the device comprising: a light input comprising three types of photodetectors for detecting light, each of the three types of photodetectors having a respective maximal spectral sensitivity to the light within a respective one of a short, medium and long wavelength zone thereof, each of the three types of photodetectors producing a respective photodetector signal indicative of a respective spectral excitation level thereof within the respective wavelength zones thereof; a controller in operative communication with the three types of photodetectors and comprising a memory of processor executable code that when executed perform computer implementable steps comprising: receiving the photodetector signals; determining the spectral excitation level of each of the three photodetector types within the respective wavelength zones thereof based on the received photodetector signals; producing a given one of three distinctive color signals for a given one of the received photodetector signals when the given one of the received photodetector signals is indicative of a highest spectral excitation level of a given one of the three types of photodetectors within the respective wavelength zone thereof relative to the other two photodetector types; producing a given one of a plurality of intermediary color signals for a given one of the received photodetector signals when the given one of the received photodetector signals is indicative that a given one of the three photodetector types is not at the highest spectral excitation level thereof within the respective wavelength zone thereof and the the spectral excitation level thereof overlaps with the spectral excitation level of one or both of the other two photodetectors; communicating the produced given distinctive and intermediary color signals; and a color output comprising plurality of color channels in operative communication with the controller for receiving the communicated given distinctive and intermediary color signals therefrom, wherein each of the color channels is respectively activated by a respective one of the received given distinctive and intermediary color signals to produce a respective color selected from three distinctive colors and a plurality of intermediary colors.

In accordance with an aspect of the present disclosure, there is provided a method for demultiplexing photodetector signals for multichannel spectral detection, the method comprising: detecting light with three types of photodetectors having respective maximal spectral sensitivities to the light within a respective one of a short, medium and long wavelength zone thereof; producing a respective photodetector signal for each of the three types of photodetector signals indicative of a respective spectral excitation level within the respective wavelength zone thereof; determining the spectral excitation level of each of the three photodetector types within the respective wavelength zones thereof based on the photodetector signals produced thereby; producing a given one of three distinctive color signals for a given one of the received photodetector signals when the given one of the received photodetector signals is indicative of a highest spectral excitation level of a given one of the three types of photodetectors within the respective wavelength zone thereof relative to the other two photodetector types; producing a given one of a plurality of intermediary color signals for a given one of the received photodetector signals when the given one of the received photodetector signals is indicative that a given one of the three photodetector types is not at the highest spectral excitation level thereof within the respective wavelength zone thereof and the the spectral excitation level thereof overlaps with the spectral excitation level of one or both of the other two photodetectors; communicating the produced given distinctive and intermediary color signals to a plurality of color channels; activating each of color channels by a respective one of the received given distinctive and intermediary color signals to produce a respective color selected from three distinctive colors and a plurality of intermediary colors.

In an embodiment, the given one of the three distinctive color signals is produced when a highest interval of the spectral excitation level of the given one of the three photodetectors is at the highest spectral excitation level within the respective wavelength zone thereof relative to the other two photodetector types and does not overlap with the spectral excitation levels of both of the other two photodetectors within their respective wavelength zones.

In an embodiment, the given one of the intermediary color signals is produced when an interval of the spectral of the given one of the three photodetectors overlaps with an interval or intervals of the spectral excitation level of one or both of the other two photodetectors to define a common excitation interval therewith.

In an embodiment, an intensity of the produced distinctive color signal is modulated by a relative difference between the highest interval of the spectral excitation and another lower interval thereof that overlaps with the an interval or intervals of the spectral excitation levels of one both of the other two photodetectors within their respective wavelength zones. In an embodiment, the given one of the intermediary color signals is produced when an interval of the spectral of the given one of the three photodetectors overlaps with an interval or intervals of the spectral excitation level of one or both of the other two photodetectors to define a common excitation interval therewith, wherein intensity of the produced intermediary color signal is modulated by: a further common excitation interval with one or both of the other two photodetectors; and/or another common excitation between the other two photodetectors; and/or the intensity of the produced distinctive color signal.

In an embodiment, color intensity of a given produced distinctive color of the three distinctive colors is modulated by a relative signal intensity between the given communicated distinctive color signal related to the produced distinctive color and a signal intensity produced by the other of the two photodetectors.

In an embodiment, the given one of the intermediary color signals is produced when an interval of the spectral excitation of the given one of the three photodetectors overlaps with an interval or intervals of the spectral excitation level of one or both of the other two photodetectors to define a common excitation interval therewith. In an embodiment, intensity of the produced intermediary color signal is modulated by a further common excitation interval with one or both of the other two photodetectors and/or by another common excitation between the other two photodetectors.

In embodiment, the three types of photodetectors respectively comprise: a short wavelength band(S) photodetector, the maximal spectral sensitivity to the light of the(S) photodetector is within the short wavelength zone; a medium wavelength band (M) photodetector, the maximal spectral sensitivity to the light of the (M) photodetector is within the medium wavelength zone; and a long wavelength band (L) photodetector, the maximal spectral sensitivity to the light of the (L) photodetector is within the medium wavelength zone.

In an embodiment, the plurality of color channels comprises three distinctive color producing channels for respectively producing the three distinctive colors, when the three distinctive color channels comprise: a blue color producing (B) channel for producing a blue color when the(S) photodetector is at a higher spectral excitation level thereof in the short wavelength zone than the spectral excitation level of the (M) photodetector in the medium wavelength zone and the spectral excitation level of the (L) photodetector in the long wavelength zone; a green color producing (G) channel for producing a green color when the (M) photodetector is at a higher spectral excitation level thereof in the medium wavelength zone than the spectral excitation level of the(S) photodetector in the short wavelength zone and the spectral excitation level of the (L) photodetector in the long wavelength zone; and a red color producing (R) channel for producing a green color when the (L) photodetector is at a higher spectral excitation level thereof in the long wavelength zone than the spectral excitation level of the(S) photodetector in the short wavelength zone and the spectral excitation level of the (M) photodetector in the medium wavelength zone.

In an embodiment, the plurality of color channels comprises an intermediary color producing channel for producing a yellow color when the spectral excitation level of the (M) photodetector in the medium wavelength zone and the spectral excitation of the (L) photodetector in the long wavelength zone have a common interval of excitation therebetween and the spectral excitation level of the(S) photodetector in the short wavelength zone is lower than the common interval of excitation.

In an embodiment, the plurality of color channels comprises an intermediary producing channel for producing a cyan color when the spectral excitation level of the(S) photodetector in the short wavelength zone and the spectral excitation of the (M) photodetector in the medium wavelength zone have a common interval of excitation therebetween and the spectral excitation level of the (L) photodetector in the long wavelength zone is lower than the common interval of excitation.

In an embodiment, the plurality of color channels comprises an intermediary color producing channel for producing a magenta color when the spectral excitation level of the(S) photodetector in the short wavelength zone and the spectral excitation of the (L) photodetector in the long wavelength zone have a common interval of excitation therebetween and the spectral excitation level of the (M) photodetector in the medium wavelength zone is lower than the common interval of excitation.

In an embodiment, the plurality of color channels comprises an intermediary color producing channel for producing a white color when the spectral excitation level of the(S) photodetector in the short wavelength zone and the spectral excitation of the (M) photodetector in the medium wavelength zone and the spectral excitation level of the (L) photodetector in the long wavelength zone have a common interval of excitation therebetween.

Other objects, advantages and features of the present disclosure will become more apparent upon reading of the following non-restrictive description of illustrative embodiments thereof, given by way of example only with reference to the accompanying drawings.

BRIEF DESCRIPTION OF THE DRAWINGS

The following drawings form part of the present specification and present disclosure. In the appended drawings.

DETAILED DESCRIPTION

Figure 1A:
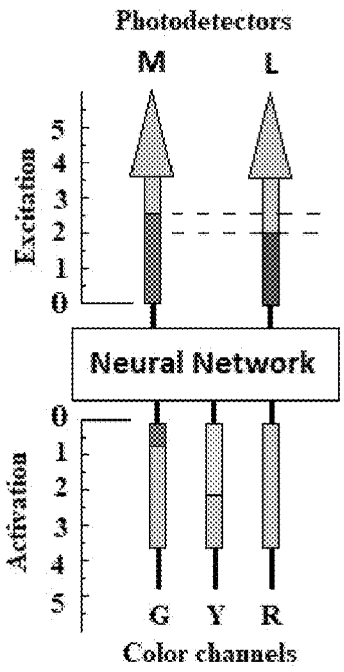
FIG. 1*a* shows a diagram of the segregation of signals from two types of photodetectors with spectral sensitivities in the medium (M) and long (L) wavelength zones to generate signals for three color channels in accordance with a non-restrictive illustrative embodiment of the present disclosure.

Generally stated and in accordance with an aspect of the present disclosure, there is provided a system and method for demultiplexing photodetector signals for multichannel spectral detection including three types of photodetectors for detecting light. The three photodetector types have a respective spectral maximal sensitivity to the light within short, medium and long wavelength zones of the light and produce a photodetector signal indicative of their respective spectral excitation level within their respective short, medium and long wavelength zones. A controller determines the spectral excitation level of each of the photodetectors within the three wavelength zones based on the photodetector signals. A given distinctive color signal is produced by the controller for a given received photodetector signal when this signal is indicative of a highest spectral excitation level of a given photodetector within its respective wavelength zone relative to the spectral excitation levels of the other two photodetectors. A given intermediary color signal is produced by the controller for a given received photodetector signal when this signal is indicative that a given photodetector is not at the highest spectral excitation level within its wavelength zone and overlaps with the excitation evel of one or both of the other two photodetectors. The given distinctive and intermediary color signals are communicated to a plurality of color channels by the controller. Each of the color channels is respectively activated by a respective one of the received given distinctive and intermediary color signals to produce a respective color selected from three distinctive colors and a plurality of intermediary colors.

The additive process combined with a subtractive process leads to the creation of color pathways for which responses are not optimally positioned along the visible spectrum. For example, the maximum spectral sensitivity of the yellow channel obtained through an additive process from (L) and (M) cone signals does not synchronize with the wavelength area for which the perception of red and green is null, following a subtractive signal process from the same types of cones. By using a mathematical model to derive the chromatic parameters from spectral sensitivity functions on a white background, Diaconu and Faubert (2006) demonstrated that the mechanisms that contribute to the spectral sensitivity function on a white background are not compatible with additive process signals from cones.

A subtractive and antagonistic process between signals from different types of cones (S, M, L) explains the segregation of cones signals in different color pathways. Indeed, within the spectral band covered by two photodetectors with overlapping wide spectral sensitivity bands, the disclosure identifies three specific zones: an area representing the spectral sensitivity band common to the two photodetectors, and two areas representing the spectral sensitivities distinctive to each photodetector.

The subtractive process of signals from two photodetectors with overlapping spectral sensitivity bands is useful for eliminating the signals that represent the common spectral sensitivity to both photodetectors, and for generating two chromatic channels specific to each photodetector with responses in two narrower and distinct spectral bands (see Equation 1 i.e., eq1).

$$|L-M| = \text{distinctive spectral sensitivity for } L \text{ and respectively for } M \text{ photodetectors.} \quad \text{(eq 1)}$$

To derive the spectral sensitivity band common to two photodetectors, a second subtractive process between the overall spectral sensitivity (L+M) photodetectors and the distinctive spectral sensitivities of each photodetector may be considered (see Equation 2 i.e., eq2).

$$((L+M)-|L-M|)*1/2 = \text{common spectral sensitivity of } L \text{ and } M \text{ photodetectors.} \quad \text{(eq 2)}$$

The solutions for Equation 2 are:

a.

$$((L+M)-|L-M|)*1/2 = L, \text{ for } L < M,$$

b.

$$((L+M)-|L-M|)*1/2 = M, \text{ for } M < L$$

In fact, solutions (a) and (b) of Equation 2, demonstrate that there is not a second subtractive process because the color channel representing the spectral sensitivity common to both photodetectors receives the signal from the least excited photodetector.

Accordingly, there is provided a system and a method of demultiplexing signals from two types of photodetectors with overlapping spectral sensitivities in order to derive signals for three channels that share the spectral sensitivity of two photodetectors in three narrower spectral bands.

The present disclosure compares the signals coming from two photodetectors redirects them to three specific channels according to their relative intensities and origins.

Figure 1B:
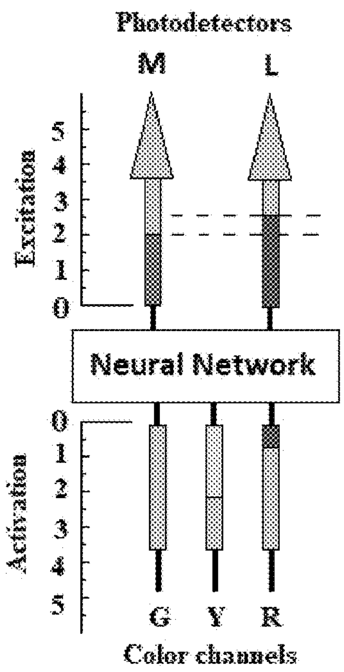
FIG. 1*b* shows another diagram of the segregation of signals from two types of photodetectors with spectral sensitivities in the medium (M) and long (L) wavelength zones to generate signals for threes color channels in accordance with a non-restrictive illustrative embodiment of the present disclosure.

FIGS. 1*a* and 1*b* illustrate respective diagrams that, in accordance with a non-restrictive illustrative embodiment, explain the segregation of signals from two types of photodetectors with spectral sensitivities in the medium (M) and long (L) wavelength zones, to generate signals for threes color channels. A green channel (G) for distinctive spectral sensitivity of the medium wavelength band (M) photodetector, a red channel (R) for distinctive spectral sensitivity of the (L) photodetector, and a yellow channel (Y) for the common photodetector spectral sensitivity.

A given wavelength zone photodetector (M, L) activates its distinctive color channel (R, G) only if the signal of that photodetector is higher than the signal of another photodetector, otherwise, this photodetector's specific color channel will remain inactive.

In FIG. 1*a*, the medium wavelength band photodetector (M) can activate the green channel (G) only if the signal of this photodetector (M) is higher than the signal of the long wavelength band photodetector (L). The green channel (G) receives a signal representing the difference between the higher signal of the medium wavelength band photodetector (M) and the lower signal of the long wavelength band photodetector (L). The lower signal of the photodetector (L) activates the yellow channel (Y) representing the common spectral sensitivity to both detectors (M and L), while the red channel (R) remains inactive.

On the other hand, and as shown in FIG. 1*b*, the long wavelength band photodetector (L) can activate the red channel (R) only if its signal is higher than the signal from the medium wavelength band photodetector (M). The red channel (R) receives a signal representing the difference between the higher signal of the long wavelength band photodetector (L) and the lower signal of the medium wavelength band photodetector (M). The lower signal from the photodetector (M) activates the yellow channel (Y) representing the spectral sensitivity common to both detectors, while the green channel (G) remains inactive.

FIGS. 1*a* and 1*b*, respectively illustrate two specific conditions for activating the yellow channel (Y) from different intensity excitations for two medium (M) and long (L) wavelength band photodetectors. FIG. 1*a* shows that a higher excitation of the medium wavelength band photodetector (M) activates the green channel (G) and blocks the red channel (R), whereas the lower signal from the long wavelength band photodetector (L) activates the yellow channel (Y). FIG. 1*b* shows that a higher excitation of the long wavelength band photodetector (L) activates the red channel (R) and blocks the green channel (G), whereas the lower excitation of the medium wavelength band photodetector (M) activates the yellow channel (Y).

Figure 2A:
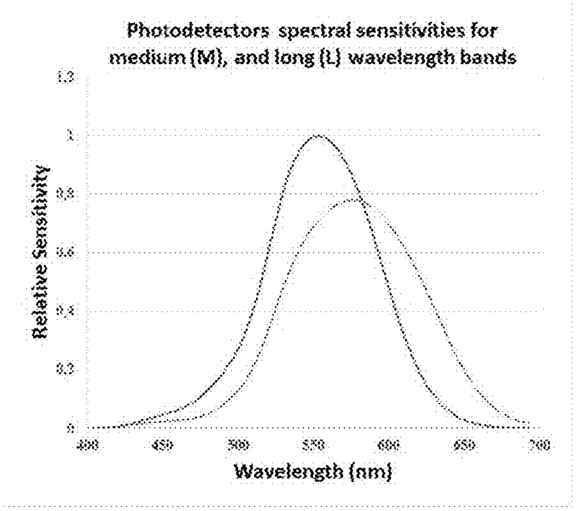
FIG. 2*a* shows the spectral sensitivities of two overlapping wideband photodetectors (M and L), and the spectral sensitivities of two red and green channels.
Figure 2B:
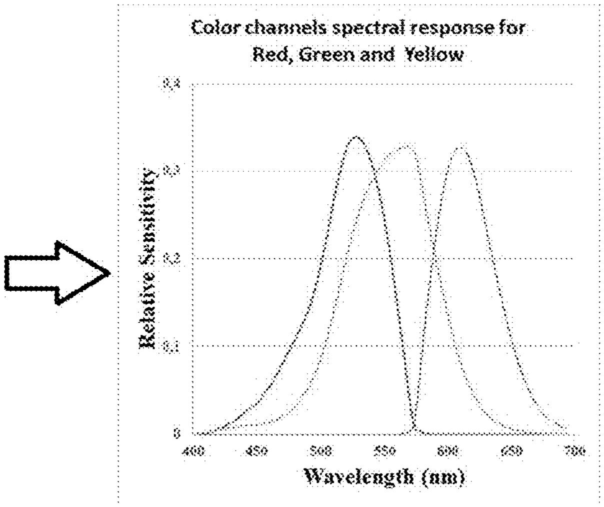
FIG. 2*b* shows the spectral sensitivities of two overlapping wideband photodetectors (M and L), and the spectral sensitivities of the three red, yellow, and green colour channels, which result from the signal demultiplexing shown in FIGS. 1*a* and 1*b;*

FIG. 2*a* shows the spectral sensitivities of two overlapping medium (M) and long (L) wavelength band photodetectors, as well as the spectral sensitivities of two red (R) and green (G) channels FIG. 2*b*. The foregoing is an illustration of a standard spectral analysis as provided by Equation 1.

Therefore, the Eq 1 separates the distinctive spectral sensitivities of long-wavelength photodetectors (L) and medium-wavelength photodetectors (M), resulting in two distinctive and antagonistic color channels for the green (G) and red (R).

To derive the spectral sensitivity band common to two photodetectors, a second subtractive process between the overall spectral sensitivity (L+M) photodetectors and the distinctive spectral sensitivities of each photodetector may be considered. (Equation 2). Equation 2 provides for further distinguishing this foregoing common area described for FIG. 2*a* by a third yellow curvature that is shown in FIG. 2*b*. Consequently, the Eq. 1 and 2 demonstrate transforming signals from two broadband spectral sensitivity photodetectors into signals for the red green color channels as well as for an additional yellow color channel.

FIG. 2*b* illustrates the spectral sensitivities of two overlapping wideband photodetectors, such as the (M) and (L) cones, as well as the spectral sensitivities of the three red, yellow, and green channels, which respectively result from the signal demultiplexing method shown in FIGS. 1*a* and 1*b*. Therefore, signals are generated for three channels (R, G, Y) with responses in specific narrow spectral bands by demultiplexing the signals from two types of photodetectors (M and L) with wide spectral sensitivity bands that overlap.

The diagram in FIG. 2*b* reveals that the system and method provided herein of signal demultiplexing generates color channels with maximum spectral sensitivities in the typical spectral zones for green, yellow, and red color perception. On the other hand, the maximum sensitivity for the yellow channel-which represents the common sensitivity to both medium (M) and long (L) wavelength band photodetectors-will always be positioned in the spectral zone with a null sensitivity for the red (R) and green (G) channels (Diaconu and Faubert JOSA, 2006).

The present signal demultiplexing method and system explains how the retinal neural network accomplishes three chromatic pathways from the signals of the two types of photodetectors with an overlapping broad spectral sensitivity.

In an embodiment, the disclosure provides for a physical instrument such as a standard RGB camera system, to characterize colors in a larger color space closer to human color perception. The classic concept of a RGB color camera proposes that each type of photodetector provides a signal for a channel corresponding to a predestined color. The present disclosure provides for segmenting the overall spectral sensitivity band covered by photodetectors in several specific spectral zones, representing the spectral sensitivity areas common to various groups of photodetectors, and the spectral sensitivity areas distinctive to each photodetector. Each specific spectral zone is associated with a chromatic channel.

The signal demultiplexing process starts by comparing the photodetector signals. The signal of the photodetector that is the least excited will activate the chromatic channel representing the common spectral sensitivity of photodetectors while its distinctive chromatic channels remain inactivated. The distinctive chromatic channels receive signals only if the photodetector associated with this distinctive channel is the most excited.

FIGS. 3*a*, 3*b*, 3*c*, and 3*d* respectively illustrate the activation of seven color channels from three types of photodetectors with spectral sensitivities in the short(S), medium (M), and long (L) wavelength spectral bands. The seven color channels are blue (B), cyan (Cy), green (G), yellow, (Y), red (R), white (W) and magenta (Ma).

The three types of photodetectors (S, M, L) have respective distinctive color channels. Accordingly, the blue color channel (B) has a distinctive spectral sensitivity from the short(S) wavelength band photodetector; the green (G) color channel has a distinctive spectral sensitivity from the medium (M) wavelength band photodetector; and the red (R) color channel has distinctive spectral sensitivity from the long (L) wavelength band photodetector.

As mentioned above, a given wavelength band (zone) photodetector (S, M, L) activates its distinctive color channel (B, G, R) only if the signal of that photodetector is higher than the signal of the other two photodetectors, otherwise, this given photodetector's distinctive/specific color channel will remain inactive. The foregoing is exemplified for: photodetector (L) which activates the red channel (R) in FIGS. 3*a* and 3*d*; photodetector(S) which activates the blue channel (B) in FIG. 3*b*; and photodetector (M) which activates the green channel in FIG. 3*c*.

Figure 3A:
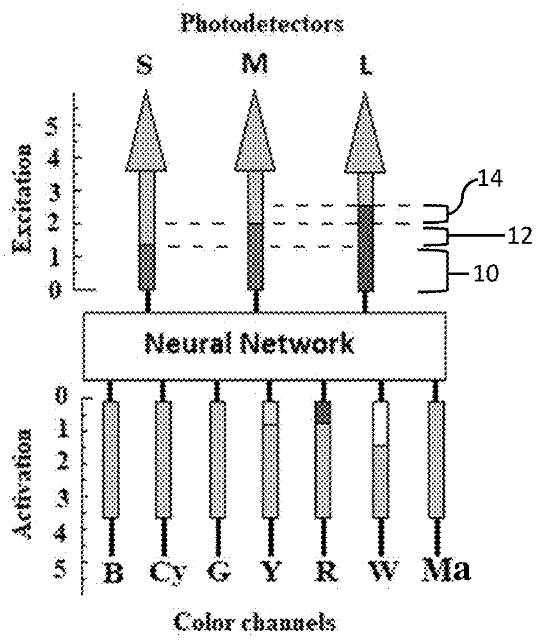
FIG. 3*a* shows a diagram of the activation of seven color channels by the signals from three types of photodetectors with spectral sensitivities in the short(S), medium (M), and long (L) wavelength spectral bands in accordance with a non-restrictive illustrative embodiment of the present disclosure.
Figure 3B:
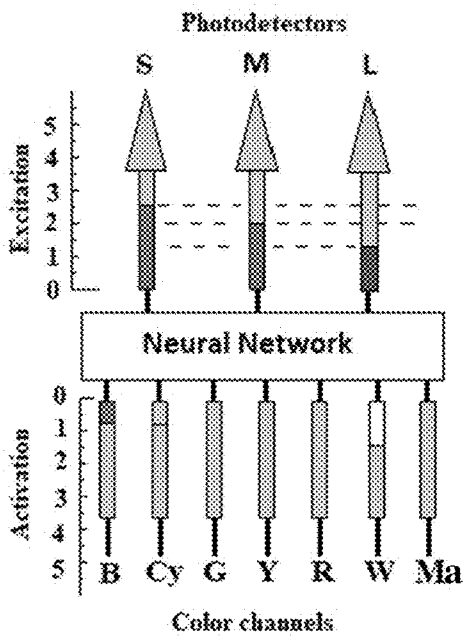
FIG. 3*b* shows a diagram of the activation of seven color channels by the signals from three types of photodetectors with spectral sensitivities in the short(S), medium (M), and long (L) wavelength spectral bands in accordance with another non-restrictive illustrative embodiment of the present disclosure.
Figure 3C:
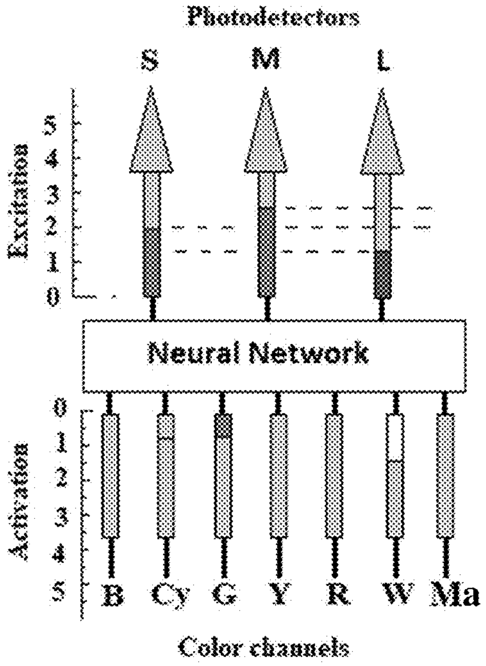
FIG. 3*c* shows a diagram of the activation of seven color channels by the signals from three types of photodetectors with spectral sensitivities in the short(S), medium (M), and long (L) wavelength spectral bands in accordance with a further non-restrictive illustrative embodiment of the present disclosure.
Figure 3D:
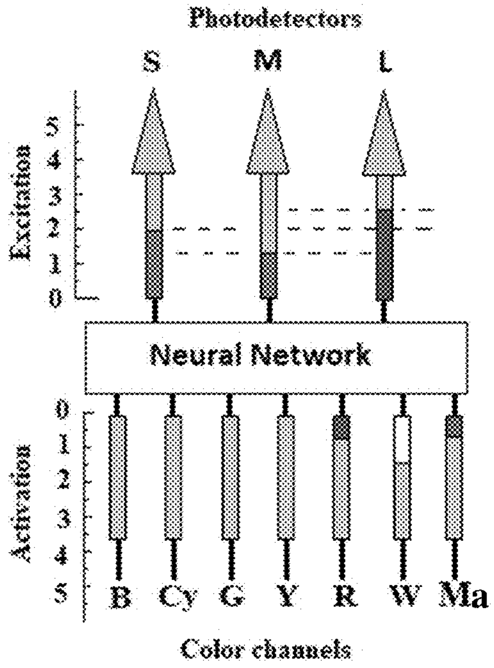
FIG. 3*d* shows a diagram of the activation of seven color channels by the signals from three types of photodetectors with spectral sensitivities in the short(S), medium (M), and long (L) wavelength spectral bands in accordance with a further non-restrictive illustrative embodiment of the present disclosure.

When there is a common interval of excitations between two or more photodetectors (S, M, L) other intermediate color channels (other than then the distinctive/specific color channels) will be activated. A common interval of excitation between medium (M) and long (L) photodetectors with a lower excitation of the short(S) photodetector activates the yellow (Y) color channel as shown in the example of FIG. 3*a*. A common interval of excitation level between the short(S) and medium (M) photodetectors with a lower excitation of the long (L) photodetector activates the cyan (Cy) color channel as shown in the examples of FIGS. 3*b* and 3*c*. A common interval of excitation level of the short(S) and medium (L) photodetectors with a lower excitation of the medium (M) photodetector activates the magenta (Ma) color channel as shown in the example of FIG. 3*d*. The white (W) channel is activated from the common interval excitation level of the three photodetectors (S, M, L) as shown in FIGS. 3*a*-3*d*.

The diagrams of FIGS. 3*a*-3*d*, show three levels of excitation for the three types of photodetectors (S, M, L).

Reference is made to the example of FIG. 3*a*, to exemplify the description and by no means limit the scope thereof. The description hereinbelow can be applied to FIGS. 3*b*, 3*c*, and 3*d*, mutatis mutandis.

Accordingly, FIG. 3*a* shows an example of the three excitation levels, namely a first or lowest excitation level 10, a second or intermediate excitation level 12 and a third or highest excitation level 12.

In FIG. 3*a*, the first photodetector level excitation 10 indicates the white channel (W) level activation. In this way, the signal coming from the least excited photodetector(S) modulates the white channel (W) intensity. The distinctive color channel (B) representing the least excited photodetector(S) remains inactivated.

At a second level 12 of photodetector excitation (M), the signal intensity from each photodetector (M, L) diminishes by the value of the signal from the least excited photodetector(S).

The color channel (Y) representing the common spectral sensitivity of the last two photodetectors (M, L) receives the signal from the least excited photodetector (M). Successively, the color channel (R) representing the most excited photodetector (L) receives the signal from this photodetector (L) diminished by the intensity of signal from the photodetector (M) at an intermediate excitation 12.

The color of a light that activates three photodetectors (S, M, L) with overlapping broadband spectral sensitivity will therefore be evaluated by the mixture of three colors. A color from distinctive channel (R) representing the most excited photodetector (L) (i.e. the third or highest excitation level 14) combined with the color of the channel (Y) representing the common excitation level, that the most excited photodetector (L) shares with the photodetector M at the intermediate excitation 12, but not shared with the photodetector S at last excitation level 10.

The intensity of the signal from the least excited photodetector(S) activates the white channel (W), which controls the color saturation of the two combined colours red (R) and yellow (Y).

The seven colours provided herein are mixed to provide still other colour perception possibilities, moreover the intensity of each colour is modulated as provided above.

Signal demultiplexing as described herein is performed at the neural network between the photodetectors and color channels shown in FIGS. 1*a*-1*b*, 3*a*-3*d*, 5*a*-5*c*.

In an embodiment, and with reference to FIGS. 1*a*-1*b*, 3*a*-3*d*, 5*a*-5*c*, the neural network comprises a controller with a processor having a memory of processor executable code that when executed performs computer implementable steps for signal demultiplexing as described herein.

In an embodiment, the photodetectors of FIGS. 1*a*-1*b*, 3*a*-3*d*, 5*a*-5*c* are provided by an RGB camera or an RGB input in operative communication with the controller.

In an embodiment, the colour channel are of FIGS. 1*a*-1*b*, 3*a*-3*d*, 5*a*-5*c* pixels provided by a display screen in in operative communication with the controller.

Figure 4A:
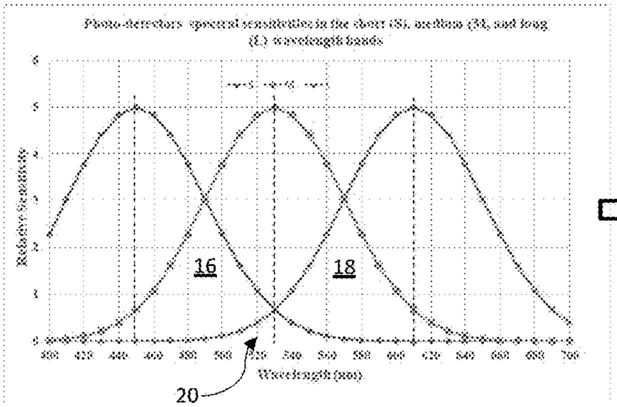
FIG. 4*a* is a graphic showing the relative spectral sensitivities of three types of photodetectors in the short(S), medium (M), and long (L) wavelength bands in accordance with a non-restrictive illustrative embodiment of the present disclosure.

FIG. 4*a* is a graph showing the relative excitation level (or relative sensitivity from 0-6) of each photodetector(S), (M), (L) at different wavelengths (nm). The excitation level of each photodetector is represented by a respective curvature on the scale of visible wavelengths Each photodetector curvature has a distinctive high excitation wavelength range and as well as overlapping medium and lower excitation wavelength ranges. The(S) and (M) curvature define there between an overlapping broadband sensitivity section 16. The (M) and (L) curvatures define there between overlapping broadband sensitivity section 18. The(S), (M) and (L) curvatures define therebetween overlapping broadband sensitivity section 20.

Figure 4B:
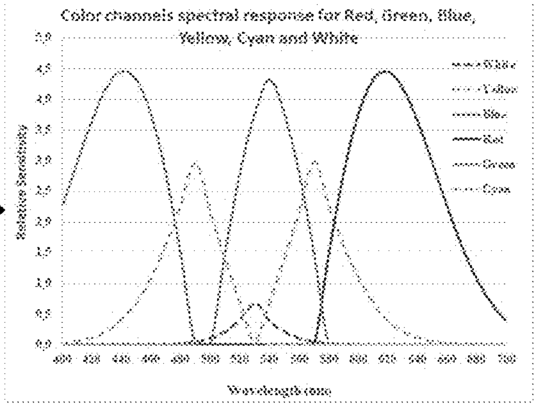
FIG. 4*b* is a graphic showing demultiplexing of the relative spectral sensitivities of the three photodetectors of FIG. 4*a* for providing a corresponding relative spectral sensitivity of the red, blue, green, yellow, cyan and white color channels along the wavelength band in accordance with a non-restrictive illustrative embodiment of the present disclosure.

The sections 16, 18, and 20 result in color confusion and thus these sections are demultiplexed to provide intermediary colors by the controller as shown in FIG. 4*b*.

FIG. 4*b*, shows that the three excitation curvatures of each(S), (M) and (L) have been more clearly defined between narrower wavelength ranges than what is shown in FIG. 4*a* and that the overlapping broadband sections 16, 18 and 20 have been replaced by intermediary colors, namely cyan, yellow, and white respectively.

FIG. 4*b* shows the results of the demultiplexing process performed at the controller level, which converts signals from three photodetectors with broadband spectral sensitivity in short, medium and long of wavelengths zones (S, M, L) into signals representative for narrower and more distinctive spectral bands. From a conventional RGB camera, which provides three signals for red, green, and blue, the demultiplexing processes transform these signals into signals representing seven color channels for red, green, blue, and for yellow, cyan, magenta, and white.

FIGS. 4*a* and 4*b* show that the color of a light that excites three photodetectors (S, M, L) with overlapping broadband spectral sensitivity (16, 18, 20) represents a mixture of three colors for the three color channel activations:

(a) The white color channel (W) represents a common level of excitation for the three photodetectors (S, M, L). The intensity activation for the white color channel (W) on the visible wavelength scale is the intensity of the signal provided by the least excited photodetector, which is (L) within wavelength range 400 nm-530 nm and(S) between within wavelength range 530 nm-650.

(b) The color channel representing the common level of excitation of the most excited photodetector and the medium excited photodetector. The intensity activation of this color channel will be the relative signal intensity between the medium excited photodetector and the least excited photodetector. For example, at wavelength 450 nm, the photodetector(S) is the most excited photodetector, and the medium excited photodetector is (M), the color channel representing the common level of excitation between the foregoing is cyan (Cy); as such, the intensity activation of the color channel (Cy) is the relative signal intensity between the medium excited photodetector (M) and the lowest excited photodetector is (L). In another example, at wavelength 610 nm, the photodetector (L) is the most excited photodetector, and the medium excited photodetector is (M), the color channel representing the common level of excitation between the foregoing is yellow (Y); as such, the intensity activation of the color channel (Y) is the relative signal intensity between the medium excited photodetector (M) and the lowest excited photodetector is(S).

(c) The color representing the most excited photodetector i.e. blue when(S) is the most excited, green when (M) is the most excited and red when (L) is the most excited. The intensity of this color (blue, green, red) will be the relative intensity of the signal intensity between the most excited photodetector and the medium excited photodetector. Therefore, the intensity of blue is the relative intensity of the signal intensity between(S) and (M). The intensity of red is the relative intensity of the signal intensity between (L) and (M). The intensity of green is the relative intensity of: (i) the signal intensity between (M) and(S) within the wavelength range of 490 nm to 530 nm; and (ii) the signal intensity between (M) and (L) within the range of 530 nm to 650 nm.

In an embodiment, the color of a light is determined by the levels of relative excitations between the photodetectors that capture this light.

Figure 5A:
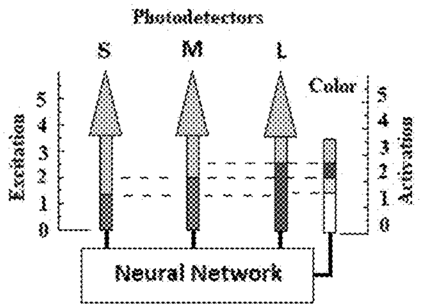
FIG. 5*a* shows a diagram of the three color perception, resulting from three photo-detectors signals demultiplexing in accordance with a non-restrictive illustrative embodiment of the present disclosure.
Figure 5B:
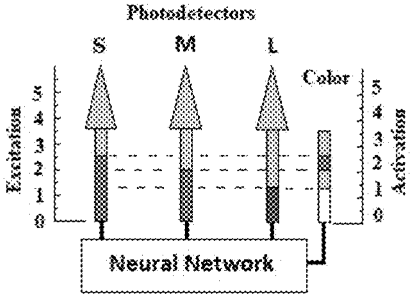
FIG. 5*b* shows a diagram of the three color perception, resulting from three photo-detectors signals demultiplexing in accordance with another non-restrictive illustrative embodiment of the present disclosure.
Figure 5C:
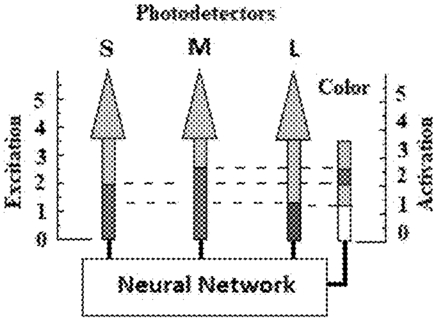
FIG. 5*c* shows a diagram of the three color perception, resulting from three photo-detectors signals demultiplexing in accordance with a further non-restrictive illustrative embodiment of the present disclosure.

FIGS. 5*a*, 5*b* and 5*c* illustrate the spectral sensitivities of three overlapping wideband photodetectors with maximal sensitivity in the(S), (M) and (L) wavelengths zone, as well as the spectral sensitivities of six color channels for red, yellow, green, cyan, blue, and white color perception, resulting from three photo-detectors signals demultiplexing method, as shown in FIGS. 3*a* and 3*b*.

Therefore, the method of demultiplexing the signals from these three photodetectors activate five color channels (i.e. white not being considered a color), red, yellow, green, cyan, and blue, with specific responses in five spectral zones and in harmony with the color perception for these spectral bands. The white channel represents a common spectral band sensitivity of the photodetectors and corresponds to a common excitation level of the three photodetectors.

In an embodiment, a standard RGB color camera is connected to the controller which executes the computer implementable steps of demultiplexing as provided hereinto to multiply the color channels representation for a light evaluated with this type of camera.

Figure 6:
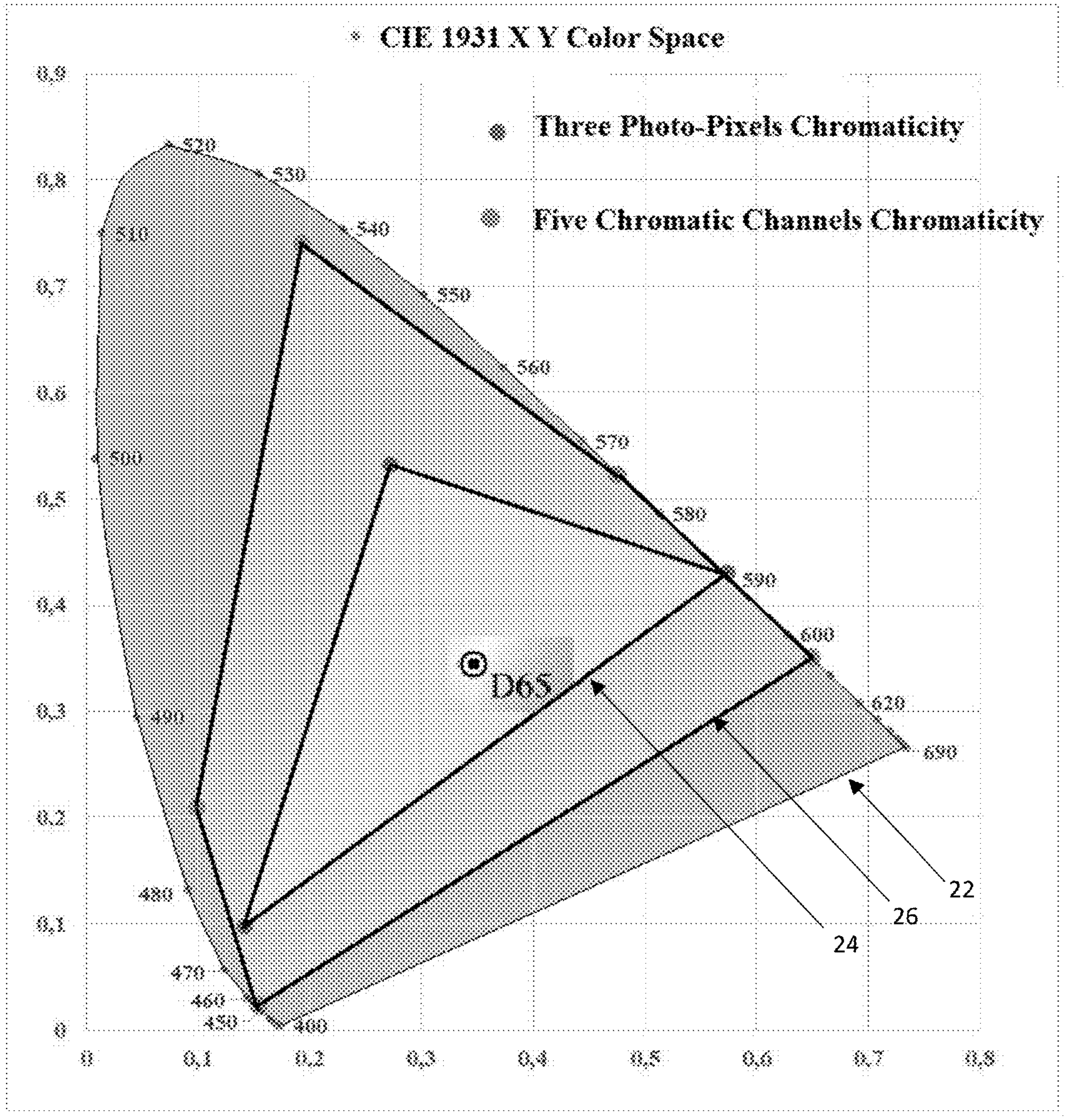
FIG. 6 shows the diagram of the International Commission on Illumination (CIE 1931) with the color space covered by an RGB color system whose chromaticity of the three colored channels was derived from the spectral sensitivity of three types of photo-pixels as shown in FIG. 4*a*.

FIG. 6 shows the diagram of the International Commission on Illumination (CIE 1931) with the color space covered by an RGB color system whose chromaticity of the three colored channels was derived from the spectral sensitivity of three types of photo-pixels as shown in FIG. 4*a*. The color space covered by the five colored channels derived by the present demultiplexing method applied to the same spectral sensitivity of the three types of photo-pixels as exposed in FIG. 4*a* is also shown in FIG. 6.

In FIG. 6, the largest area 22 is the color space perceived by the human eye and the smaller area 24 is the color space provided by RGB camera and displays. The camera photo-pixels spectral sensitivity as exposed in FIG. 4*a*. The second largest area 26 is the color space provided by the five pixels display and the present demultiplexing method applied to the RGB camera with photo-pixels spectral sensitivity as exposed in FIG. 4*a*

FIG. 6 shows a huge difference between the color space 22 engendered by the chromatic coordinates of three photo-pixels with the spectral responses shown in FIG. 4*a*, and the color space 24 engendered by the chromatic coordinates of five chromatic channels derived by the demultiplexing method applied to the three-photo-pixel spectral responses.

In an embodiment, the present method and system provide for multichannel spectral detection in spectroscopy, medical imaging, television and photography.

In an embodiment, demultiplexing as provided herein increases the spectral resolution of a spectroscopy system using two or more types of photodetectors with overlapping spectral sensitivity.

In an embodiment, demultiplexing as provided herein increases the number of color channels for a standard RGB camera.

In an embodiment, there is provided a digital display screen with several types of colored pixels for television and computers generating colored images in a wider range of colors gamut for a more realistic reproduction for colors of the environment.

In an embodiment, there is provided a digital display screen with several types of colored pixels for television and computers generating colored images in a more energy-efficient way. Example, a yellow monochromatic light is less energetic than the equivalent of the same yellow light obtained following a mixture of red and green light.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated.

It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

BIBLIOGRAPHY

1. L. M. Hurvich and D. Jameson, An opponent-process theory of color vision, Psychol. Rev. 64, 384-404 (1957).

2. V. Diaconu and J. Faubert, Chromatic parameters derived from increment spectral sensitivity functions, J. Opt. Soc. Am. A, Vol. 23, (2006).

What is claimed is:

1. A system for demultiplexing photodetector signals for multichannel spectral detection, the system comprising:

three types of photodetectors for detecting light, each of the three types of photodetectors having a respective maximal spectral sensitivity to the light within a respective one of a short, medium and long wavelength zone thereof, each of the three types of photodetectors producing a respective photodetector signal indicative of a respective spectral excitation level thereof within the respective wavelength zones thereof;

a controller in operative communication with the three types of photodetectors and comprising a memory of processor executable code that when executed perform computer implementable steps comprising:

a) receiving the photodetector signals;

b) determining the spectral excitation level of each of the three photodetector types within the respective wavelength zones thereof based on the received photodetector signals;

c) producing a given one of three distinctive color signals for a given one of the received photodetector signals when the given one of the received photodetector signals is indicative of a highest spectral excitation level of a given one of the three types of photodetectors within the respective wavelength zone thereof relative to the other two photodetector types;

d) producing a given one of a plurality of intermediary color signals for a given one of the received photodetector signals when the given one of the received photodetector signals is indicative that a given one of the three photodetector types is not at the highest spectral excitation level thereof within the respective wavelength zone thereof and the spectral excitation level thereof overlaps with the spectral excitation level of one or both of the other two photodetectors;

e) communicating the produced given distinctive and intermediary color signals; and a plurality of color channels in operative communication with the controller for receiving the communicated given distinctive and intermediary color signals therefrom, wherein each of the color channels is respectively activated by a respective one of the received given distinctive and intermediary color signals to produce a respective color selected from three distinctive colors and a plurality of intermediary colors.

2. A system according to claim 1, wherein the given one of the three distinctive color signals is produced when a highest interval of the spectral excitation level of the given one of the three photodetectors is at the highest spectral excitation level within the respective wavelength zone thereof relative to the other two photodetector types and does not overlap with the spectral excitation levels of both of the other two photodetectors within their respective wavelength zones.

3. A system according to claim 2, wherein an intensity of the produced distinctive color signal is modulated by a relative difference between the highest interval of the spectral excitation and another lower interval thereof that overlaps with the an interval or intervals of the spectral excitation levels of one both of the other two photodetectors within their respective wavelength zones.

4. A system according to claim 1, wherein color intensity of a given produced distinctive color of the three distinctive colors is modulated by a relative signal intensity between the given communicated distinctive color signal related to the produced distinctive color and a signal intensity produced by the other of the two photodetectors.

5. A system according to claim 2, wherein the given one of the intermediary color signals is produced when an interval of the spectral of the given one of the three photodetectors overlaps with an interval or intervals of the spectral excitation level of one or both of the other two photodetectors to define a common excitation interval therewith.

6. A system according to claim 3, wherein the given one of the intermediary color signals is produced when an interval of the spectral of the given one of the three photodetectors overlaps with an interval or intervals of the spectral excitation level of one or both of the other two photodetectors to define a common excitation interval therewith, wherein intensity of the produced intermediary color signal is modulated by:

a further common excitation interval with one or both of the other two photodetectors; and/or another common excitation between the other two photodetectors; and/or the intensity of the produced distinctive color signal.

7. A system according to claim 1, wherein the given one of the intermediary color signals is produced when an interval of the spectral excitation of the given one of the three photodetectors overlaps with an interval or intervals of the spectral excitation level of one or both of the other two photodetectors to define a common excitation interval therewith.

8. A system according to claim 7, wherein intensity of the produced intermediary color signal is modulated by a further common excitation interval with one or both of the other two photodetectors and/or by another common excitation between the other two photodetectors.

9. A system according to claim 1, wherein the three types of photodetectors respectively comprise:

a short wavelength band(S) photodetector, the maximal spectral sensitivity to the light of the(S) photodetector is within the short wavelength zone;

a medium wavelength band (M) photodetector, the maximal spectral sensitivity to the light of the (M) photodetector is within the medium wavelength zone; and a long wavelength band (L) photodetector, the maximal spectral sensitivity to the light of the (L) photodetector is within the medium wavelength zone.

10. A system according to claim 9, wherein the plurality of color channels comprises three distinctive color producing channels for respectively producing the three distinctive colors, when the three distinctive color channels comprise:

a blue color producing (B) channel for producing a blue color when the(S) photodetector is at a higher spectral excitation level thereof in the short wavelength zone than the spectral excitation level of the (M) photodetector in the medium wavelength zone and the spectral excitation level of the (L) photodetector in the long wavelength zone;

a green color producing (G) channel for producing a green color when the (M) photodetector is at a higher spectral excitation level thereof in the medium wavelength zone than the spectral excitation level of the(S) photodetector in the short wavelength zone and the spectral excitation level of the (L) photodetector in the long wavelength zone; and a red color producing (R) channel for producing a green color when the (L) photodetector is at a higher spectral excitation level thereof in the long wavelength zone than the spectral excitation level of the(S) photodetector in the short wavelength zone and the spectral excitation level of the (M) photodetector in the medium wavelength zone.

11. A system according to claim 10, wherein the plurality of color channels comprises an intermediary color producing channel for producing a yellow color when the spectral excitation level of the (M) photodetector in the medium wavelength zone and the spectral excitation of the (L) photodetector in the long wavelength zone have a common interval of excitation therebetween and the spectral excitation level of the(S) photodetector in the short wavelength zone is lower than the common interval of excitation.

12. A system according to claim 10, wherein the plurality of color channels comprises an intermediary producing channel for producing a cyan color when the spectral excitation level of the(S) photodetector in the short wavelength zone and the spectral excitation of the (M) photodetector in the medium wavelength zone have a common interval of excitation therebetween and the spectral excitation level of the (L) photodetector in the long wavelength zone is lower than the common interval of excitation.

13. A system according to claim 10, wherein the plurality of color channels comprises an intermediary color producing channel for producing a magenta color when the spectral excitation level of the(S) photodetector in the short wavelength zone and the spectral excitation of the (L) photodetector in the long wavelength zone have a common interval of excitation therebetween and the spectral excitation level of the (M) photodetector in the medium wavelength zone is lower than the common interval of excitation.

14. A system according to claim 10, wherein the plurality of color channels comprises an intermediary color producing channel for producing a white color when the spectral excitation level of the(S) photodetector in the short wavelength zone and the spectral excitation of the (M) photodetector in the medium wavelength zone and the spectral excitation level of the (L) photodetector in the long wavelength zone have a common interval of excitation therebetween.

15. A device according to claim 1, wherein the given one of the intermediary color signals is produced when an interval of the spectral excitation of the given one of the three photodetectors overlaps with an interval or intervals of the spectral excitation level of one or both of the other two photodetectors to define a common excitation interval therewith.

16. A device for demultiplexing photodetector signals for multichannel spectral detection, the device comprising:

a light input comprising three types of photodetectors for detecting light, each of the three types of photodetectors having a respective maximal spectral sensitivity to the light within a respective one of a short, medium and long wavelength zone thereof, each of the three types of photodetectors producing a respective photodetector signal indicative of a respective spectral excitation level thereof within the respective wavelength zones thereof;

a controller in operative communication with the three types of photodetectors and comprising a memory of processor executable code that when executed perform computer implementable steps comprising:

a) receiving the photodetector signals;

b) determining the spectral excitation level of each of the three photodetector types within the respective wavelength zones thereof based on the received photodetector signals;

c) producing a given one of three distinctive color signals for a given one of the received photodetector signals when the given one of the received photodetector signals is indicative of a highest spectral excitation level of a given one of the three types of photodetectors within the respective wavelength zone thereof relative to the other two photodetector types;

d) producing a given one of a plurality of intermediary color signals for a given one of the received photodetector signals when the given one of the received photodetector signals is indicative that a given one of the three photodetector types is not at the highest spectral excitation level thereof within the respective wavelength zone thereof and the the spectral excitation level thereof overlaps with the spectral excitation level of one or both of the other two photodetectors;

e) communicating the produced given distinctive and intermediary color signals; and a color output comprising plurality of color channels in operative communication with the controller for receiving the communicated given distinctive and intermediary color signals therefrom, wherein each of the color channels is respectively activated by a respective one of the received given distinctive and intermediary color signals to produce a respective color selected from three distinctive colors and a plurality of intermediary colors.

17. A device according to claim 16, wherein the given one of the three distinctive color signals is produced when a highest interval of the spectral excitation level of the given one of the three photodetectors is at the highest spectral excitation level within the respective wavelength zone thereof relative to the other two photodetector types and does not overlap with the spectral excitation levels of both of the other two photodetectors within their respective wavelength zones.

18. A device according to claim 17, wherein an intensity of the produced distinctive color signal is modulated by a relative difference between the highest interval of the spectral excitation and another lower interval thereof that overlaps with the an interval or intervals of the spectral excitation levels of one both of the other two photodetectors within their respective wavelength zones.

19. A device according to claim 17, wherein the given one of the intermediary color signals is produced when an interval of the spectral of the given one of the three photodetectors overlaps with an interval or intervals of the spectral excitation level of one or both of the other two photodetectors to define a common excitation interval therewith.

20. A method for demultiplexing photodetector signals for multichannel spectral detection, the method comprising:

detecting light with three types of photodetectors having respective maximal spectral sensitivities to the light within a respective one of a short, medium and long wavelength zone thereof;

producing a respective photodetector signal for each of the three types of photodetector signals indicative of a respective spectral excitation level within the respective wavelength zone thereof;

determining the spectral excitation level of each of the three photodetector types within the respective wavelength zones thereof based on the photodetector signals produced thereby;

producing a given one of three distinctive color signals for a given one of the received photodetector signals when the given one of the received photodetector signals is indicative of a highest spectral excitation level of a given one of the three types of photodetectors within the respective wavelength zone thereof relative to the other two photodetector types;

producing a given one of a plurality of intermediary color signals for a given one of the received photodetector signals when the given one of the received photodetector signals is indicative that a given one of the three photodetector types is not at the highest spectral excitation level thereof within the respective wavelength zone thereof and the the spectral excitation level thereof overlaps with the spectral excitation level of one or both of the other two photodetectors;

communicating the produced given distinctive and intermediary color signals to a plurality of color channels;

activating each of color channels by a respective one of the received given distinctive and intermediary color signals to produce a respective color selected from three distinctive colors and a plurality of intermediary colors.

* * * * *